F. P. MURPHEY.
CLUTCH MECHANISM.
APPLICATION FILED MAR. 30, 1909.
946,702.
Patented Jan. 18, 1910.
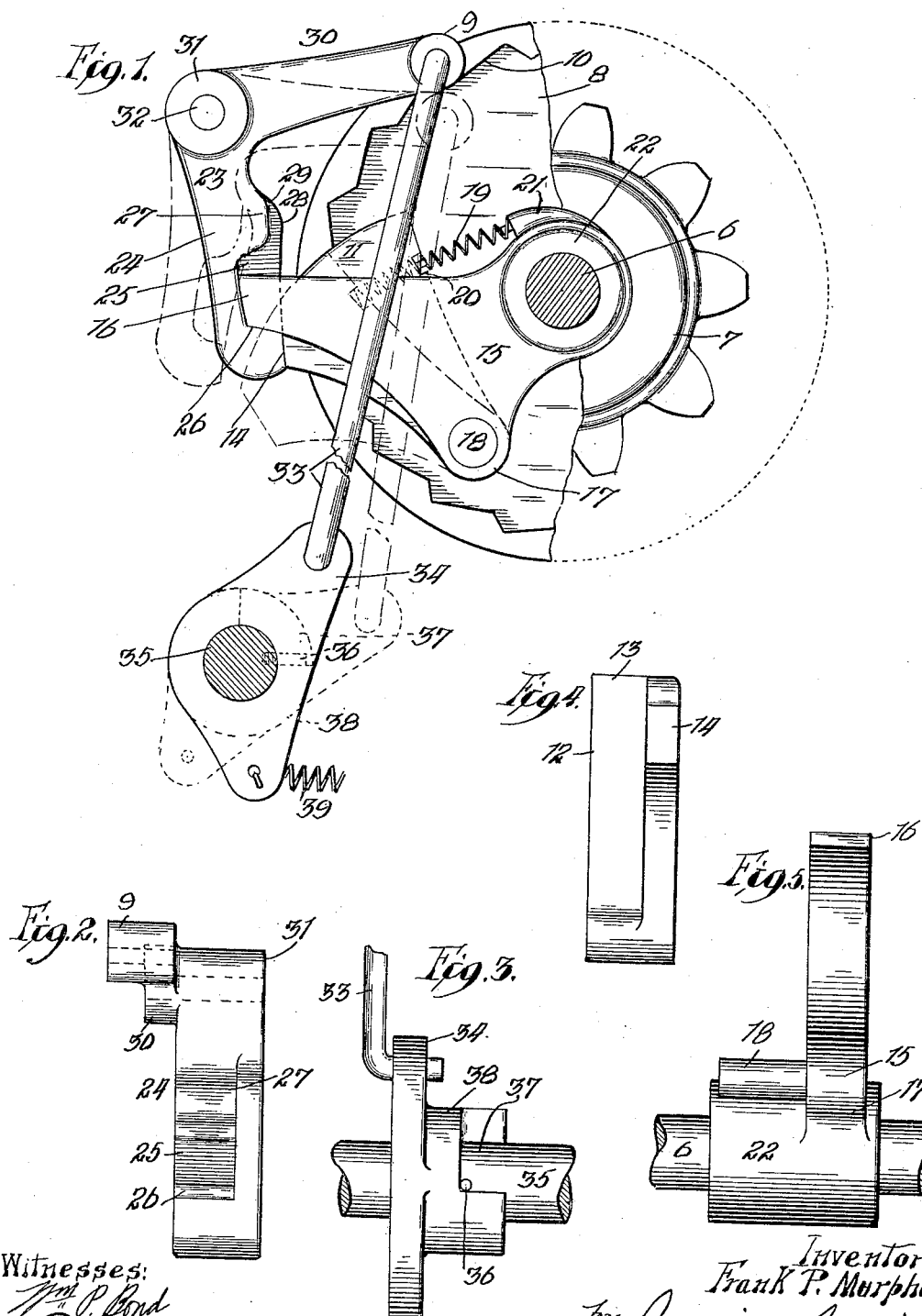
Witnesses:
Wm P. Bond
Pierson W. Banning
Inventor:
Frank P. Murphey
by Banning & Banning
Attys.

UNITED STATES PATENT OFFICE.

FRANK P. MURPHEY, OF DECATUR, ILLINOIS.

CLUTCH MECHANISM.

946,702. Specification of Letters Patent. Patented Jan. 18, 1910.

Application filed March 30, 1909. Serial No. 486,757.

*To all whom it may concern:*

Be it known that I, FRANK P. MURPHEY, a citizen of the United States, residing at Decatur, in the county of Macon and State of Illinois, have invented certain new and useful Improvements in Clutch Mechanism, of which the following is a specification.

The clutch mechanism of the present invention is intended more particularly for use in corn planters for throwing into clutch the shaft which actuates the dropper mechanism with each movement imparted by a knot in the check row wire.

The object of the present invention is to simplify and improve the construction of the clutch as a whole, so that it will be strong and durable and at the same time will afford suitable means for locking and holding the clutch elements in their normal position during the intervals of inactivity.

Although the clutch is intended primarily for corn planters, it is not the intention to limit the invention strictly to employment in machines of this kind, since it might be otherwise employed in some other connection without substantial modification.

Further objects will appear from a detailed description of the invention, which consists in the features of construction and combination of parts hereinafter described and claimed.

In the drawings, Figure 1 is a side elevation of the clutch in normal or unclutched position, showing the clutch disk partially broken away; Fig. 2 an edge elevation of the bell crank lock; Fig. 3 a side elevation of the check row shaft, showing the operating lever in elevation; Fig. 4 an edge elevation of the pivoted dog for engaging the clutch teeth; and Fig. 5 an edge elevation of the locking arm to which the dog is pivoted.

The clutch elements are mounted upon a dropper actuating shaft 6 which, when rotated, serves to actuate dropper mechanism of any suitable type. The shaft has loosely mounted thereon a constantly rotating sprocket wheel 7 which is intended to be driven in any suitable manner by connections with driving wheels of the planter. The sprocket wheel has connected therewith a clutch disk 8, which is also loosely mounted upon the shaft 6, which disk has, around its periphery on one side, a flange 9 provided with inner clutch teeth 10. The teeth coöperate with a dog 11 of segmental shape, which is provided, along its inner edge, with an inwardly extending flange 12, the end 13 of which is adapted to swing into position to engage one of the clutch teeth 10 when the dog is swung toward the toothed rim of the disk. The body of the dog overlies the face of the rim or flange 9, occupying, when the parts are unclutched, the position indicated in full lines in Fig. 1, and occupying, when the parts are in clutch, the position shown in dotted lines. The normally projecting portion of the body of the dog, as shown in Fig. 1, terminates in a slightly curved contact face 14, the function of which will be hereinafter explained.

The dog underlies a locking arm 15 rigidly secured to and rotatable with the shaft 6, which arm projects beyond the periphery of the clutch disk and beyond the contact face 14 of the dog when the latter is in normal position, and terminates in a locking finger 16. The arm is further provided with a thumb 17, to which the tapered inner end of the dog is pivoted by means of a pivot pin 18, which permits the opposite end of the dog to swing out into or back from engagement with the clutch teeth. The dog is normally held in outwardly projected or clutching position by means of an expansion coil spring 19, the outer end of which enters a studded recess 20 on the inner edge of the dog, and the inner end of which bears against a lug 21 formed on the hub 22, to which the locking arm is attached. The dog and locking finger both coöperate with a bell crank 23, the lower arm 24 of which is provided, on its inner edge, with a recess 25 formed in the outer face of the arm, which recess is adapted to receive the end of the locking finger 16, which end is slightly beveled or rounded, as shown. The recess terminates back to the extreme end of the arm, leaving a stop shoulder 26 which is adapted to limit the movement of the locking finger and lock the parts in unclutched position. The inner end of the slot is limited by a rounded shoulder 27, over which the end of the locking finger is adapted to ride prior to its entering the recess 25 and engaging the shoulder 26.

The uncut portion of the arm 24 is provided, at its outer end, with a curved inner edge 28 having a curvature equal to the curvature of the contact face 14, which permits the latter to ride along the curved inner edge 28 until it reaches its limit of movement. The curved inner edge, at its inner end, recedes away to afford a rounded cam surface 29 which is adapted to throw back the dog against the tension of the spring when the dog is brought into contact therewith. The upper arm 30 of the bell crank is offset with respect to the lower arm to permit the locking arm to ride under this portion of the bell crank, which bell crank is pivoted at its elbow 31 to a pin or shaft 32 suitably supported upon the framework of the corn planter or other machine to which the clutch is applied. The arm 30, which may be termed the operating arm, has pivoted thereto an operating rod 33, the end of which engages a double-ended lever 34 loosely mounted upon a check row shaft 35, which is provided with an outwardly projecting pin 36 adapted to swing within a slot 37 in a hub 38 formed on the double-ended lever, which is adapted to be moved against a tension of a spring 39.

In use, with the parts in the position shown in Fig. 1, the outwardly projecting finger of the locking arm will be held against movement by its engagement with the slot or recess in the lower arm of the bell crank and the dog will be thrown back toward the center by its engagement with the edge 28 of the bell crank, in which position it will be held against the tension of the spring 19, allowing the sprocket wheel and clutch disk to revolve freely around the shaft 6 which will remain stationary in this position of adjustment. When the check row shaft is moved in the proper direction, the pin 36 will engage the end wall of the slot 37, thereby causing the double-ended lever to move into the position shown in dotted lines, which movement will be imparted through the rod 33 to the bell crank, swinging the latter back into the position shown in dotted lines. This movement of the bell crank serves to release the locking finger and also to release the dog, which, under the action of the spring, will be thrown into position to bring the end 13 of the flange 12 into engagement with one of the clutch teeth, which sets the clutch and causes the dog and locking arm to revolve with the clutch disk, thereby imparting rotation to the dropper operating shaft 6. The shaft will rotate through a complete revolution and until the projecting end of the locking finger is brought into engagement with the shoulder 27 of the bell crank, which, immediately after throwing the members in clutch, will be released by the return movement of the check row shaft and will occupy the position shown in full lines in Fig. 1. As the locking finger strikes the shoulder 27, it will throw back the bell crank sufficiently to permit the finger to clear the shoulder, which movement is possible by reason of the clearance afforded by the slot 37. During the same movement of the locking arm, the contact face 14 of the dog will engage the cam surface 29, thereby throwing back the dog out of clutch, so that the parts will come to rest when the locking finger is brought into engagement with the shoulder 26, thereby preventing any further movement of the parts due to acquired momentum.

The construction is one which throws the clutch into mesh for a given period of time by a single momentary trip action, and at the same time provides means for locking the parts in their non-clutched position during the intervals of rest. The arrangement is one which permits the parts to be made strong and rigid, and at the same time is extremely simple in arrangement and satisfactory in operation.

What I regard as new and desire to secure by Letters Patent is:

1. In a clutch mechanism, the combination of a clutch disk provided with an inwardly facing clutch surface, a shaft upon which the disk is mounted, an arm mounted upon the shaft, a dog pivoted to the arm, means for throwing the dog outwardly into clutching position, a bell crank lever adapted to retract the dog and engage and lock the arm, a rod connected with the bell crank lever, an operating lever with which the opposite end of the rod is connected, said arm springing from a hub provided with a slot, a shaft upon which the hub is loosely mounted, and a pin outwardly projecting from the shaft and adapted to move within the slot, substantially as described.

2. In a clutch mechanism, the combination of a clutch disk, a dog adapted when released to engage the disk, an arm to which the dog is connected, a trip member adapted to throw the dog out of clutching position and to engage and lock the arm, an operating rod connected with the trip member, a lever with which the rod connects, said lever springing from a hub provided with a slot, a shaft upon which the hub is mounted, and a pin outwardly projecting from the shaft and operating within the slot, substantially as described.

3. In a clutch mechanism, the combination of a shaft, a clutch disk loosely mounted thereon and provided with a flange having inner clutch teeth, an arm rigidly secured to the shaft and outwardly projecting beyond the periphery of the clutch disk, a dog pivoted to the arm and adapted to engage the inner clutch teeth when released, a spring bearing against the dog for throwing it into clutching position, a bell crank lever provided on one arm with a cam surface adapted to engage with and retract the dog, and provided with a shoulder adapted to engage and lock the arm, a rod connected with the other arm of the bell crank lever, a lever with which the rod connects, a hub from which the lever springs, said hub being provided with a slot, a shaft upon which the hub is mounted, and a pin outwardly extending from the shaft and adapted to work within the slot in the hub, substantially as described.

4. In a clutch mechanism, the combination of a clutch disk, a dog adapted when released to engage the disk, an arm to which the dog is connected, a trip member adapted to throw the dog out of engaging position and to engage and lock the arm, an operating rod connected with the trip member, a lever with which the rod connects, a hub for the lever, and a shaft upon which the hub is mounted, in a manner to permit a partial revolution to the hub independently of the shaft, substantially as described.

FRANK P. MURPHEY.

Witnesses:
WALTER S. HURD,
JESSE L. DECK.